United States Patent [19]

Mueller

[11] 4,164,997
[45] Aug. 21, 1979

[54] ARTICLE TRANSPORT DEVICE AND METHOD

[75] Inventor: Martin Mueller, Wonderlake, Ill.

[73] Assignee: Owens-Illinois, Inc., Toledo, Ohio

[21] Appl. No.: 764,783

[22] Filed: Feb. 2, 1977

[51] Int. Cl.$^2$ .......................................... B65G 47/26
[52] U.S. Cl. .................................... 198/427; 198/441;
198/480; 198/484; 198/792
[58] Field of Search ............... 198/427, 441, 478, 480,
198/482, 484, 792, 339, 425, 472

[56] References Cited

U.S. PATENT DOCUMENTS

| | | | |
|---|---|---|---|
| 1,284,637 | 11/1918 | Foss | 198/427 |
| 1,284,638 | 11/1918 | Foss | 198/427 |
| 1,581,201 | 4/1926 | Guenther | 198/792 |
| 1,695,511 | 12/1928 | Smith | 198/484 |
| 1,775,381 | 9/1930 | Angus | 198/482 |
| 1,846,009 | 2/1932 | White et al. | 198/792 |
| 2,388,804 | 11/1945 | Schurch | 198/792 |
| 3,630,502 | 12/1971 | Schmidt | 198/792 |
| 3,717,236 | 2/1973 | New | 198/792 |
| 3,729,085 | 4/1973 | Schlueter et al. | 198/792 |
| 3,952,865 | 4/1976 | Rudszinat et al. | 198/792 |
| 4,003,461 | 1/1977 | Speaker et al. | 198/792 |

FOREIGN PATENT DOCUMENTS

| | | | |
|---|---|---|---|
| 2605775 | 8/1977 | Fed. Rep. of Germany | 198/425 |
| 1243910 | 9/1960 | France | 198/339 |

*Primary Examiner*—Joseph E. Valenza
*Attorney, Agent, or Firm*—David R. Birchall; Myron E. Click; David H. Wilson

[57] ABSTRACT

An apparatus for receiving a single line of containers and grouping them so that a plurality of containers can be delivered to an exit line. The apparatus contains a starwheel arrangement wherein the starwheel is comprised of a plurality of sectors each moveable with respect to each other. Each sector transports a plurality of containers at a constant velocity around an arcuate extent. The sectors and their containers accelerate for a portion of their travel, then stop, whereupon the containers are moved in a radially outward direction to a delivery point upon an adjacent conveyor. The method of receiving containers on a starwheel arrangement and simultaneously ejecting a plurality of containers from the starwheel to an adjacent conveyor is set forth in detail. The containers enter the starwheel in usual singular line fashion and are delivered from the starwheel in groups.

14 Claims, 9 Drawing Figures

ARTICLE TRANSPORT DEVICE AND METHOD

BACKGROUND OF THE INVENTION

It has been quite common for some time to utilize conveyor systems to advance a single line of containers from one position to another. The single line of containers can be made to change direction and elevation without great difficulty as is evident in the prior art. It becomes more difficult to convert a single line of containers into a double, triple or even greater number of containers. Various devices and methods have been devised to group containers together for delivery to packing cases and other shipping devices, however, with the advent of high speed lines, it becomes difficult to properly assemble and group a plurality of containers all arriving at a common point by way of a single line conveyor. The container handling problem becomes more difficult when the containers are fragile in nature such as for example paper or plastic. Then too, the task of transporting such containers with a product packed therein increases the difficulties of grouping the containers for packaging.

THE PRESENT INVENTION

This invention relates to the handling of articles. More particularly, the invention relates to an articulated starwheel arrangement for receiving a single line of containers, then delivering the containers to an adjacent conveyor in groups of several containers abreast of one another in columns or rows. The present invention employs a starwheel that varies from the standard starwheel in that it is not fabricated from a single planar piece of material. In the present invention, the starwheel is comprised of sectors positioned adjacent each other to form an arcuately disposed starwheel. The containers are stored within pockets positioned around the periphery of the starwheel and are delivered sector by sector to an adjacent conveyor belt.

Instead of delivering containers one at a time from the starwheel as has been common in the past, the container carrying sectors each have the capability of moving in a radially outward direction, thus simultaneously delivering all of the containers lodged within the pockets of each sector. Containers or similar articles are introduced into the pockets of the starwheel one by one, however, in the discharge function, all of the containers are simultaneously discharged from the sector of the starwheel.

The unique starwheel arrangement of the present invention is made possible by dividing the starwheel into a number of sectors, each having an equal arcuate extent and positioning container carrying units or sectors into all of the sector positions except one. The empty sector position provides room for the remainder of the article carrying sectors to move in an arcuate direction with respect to each other. In this manner, each sector can briefly accelerate, deaccelerate, unload and join the remainder of the sectors as they advance around the starwheel path.

It is an object of the present invention to provide a device for receiving a single line of articles, then delivering the same articles so that they are arranged in a plurality of columns or rows.

Another object of the present invention is to provide an articulated starwheel arrangement whereby containers are picked up one by one and are delivered in groups from the starwheel.

A further object of the present invention is to provide a method for the handling of articles to facilitate the packaging thereof.

An additional object of the present invention is to set forth a starwheel comprising a plurality of sectors that move independently one with respect to the other.

Another object of this invention is to provide a method of moving containers or the like from a starwheel in groups of more than one.

Additional objects and advantages of the present invention can be readily understood by reference to the following specification drawings and claims.

DETAILED DESCRIPTION OF THE INVENTION

In the movement of articles such as for example containers from one place to another, it is common to utilize conveyor belts where the containers can be placed to form a line of containers arranged in seriatim. The conveyor belt arrangement for transporting containers does possess serious limitations in that it becomes difficult to change the direction of the containers as they advance along with the conveyor belt. It has been found convenient to position a starwheel device adjacent to a conveyor belt in order to remove the containers one by one from the belt and deposit them on an adjacent belt or packaging tray. The starwheel is generally in the shape of a large gear, however, the teeth of the gear are rather large and form individual pockets therebetween to accommodate each container. The peripheral speed of the starwheel is constant and it matches the speed of the containers as they progress along the conveyor belt.

Since the ordinary starwheel arrangement is adapted to intercept individual containers and move them in an arcuate path around the periphery of the starwheel, it must also discharge the containers in a similar manner, that is one by one. This procedure is quite acceptable if the starwheel is employed simply to change the direction of a traveling stream of containers. However, if it is desired to form a plurality of lines of containers exiting from the starwheel, other means must be provided adjacent to the starwheel in order to perform the desired grouping of the containers into a plurality of columns or rows.

In the present invention it will be seen that the starwheel arrangement itself possesses the ability to receive a single line of containers and discharge the containers into a plurality of lines without the use of auxiliary equipment.

Figure 1:
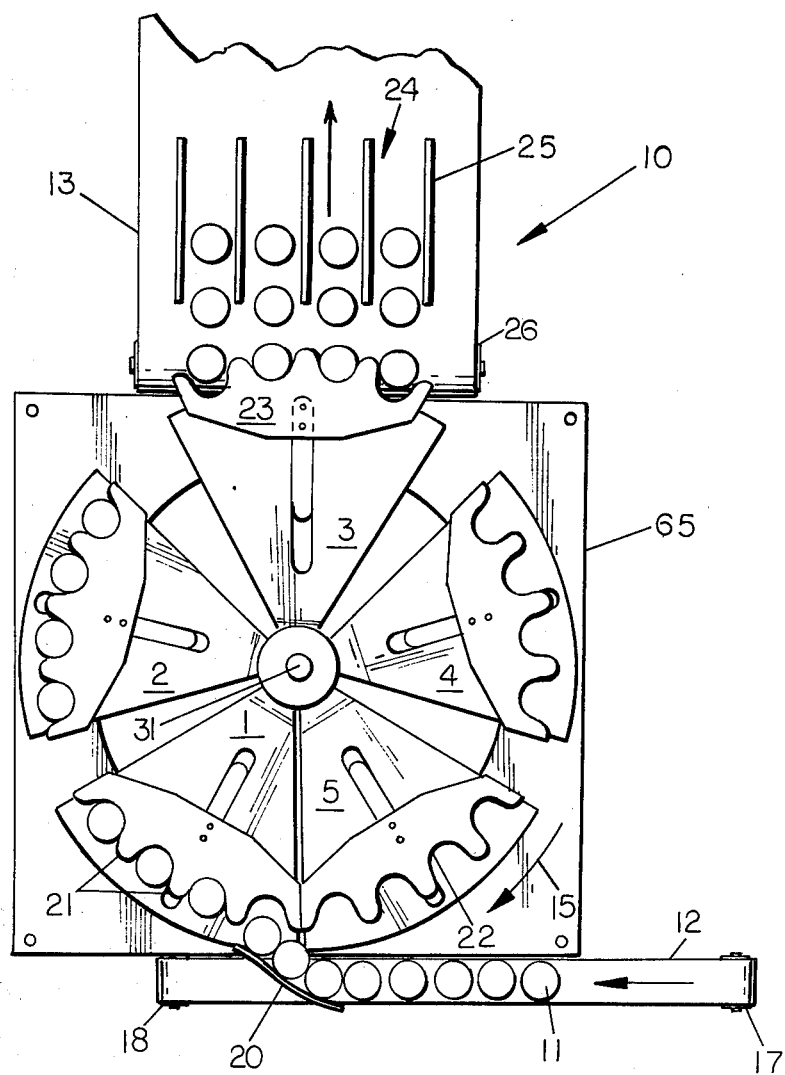
FIG. 1 is a schematic representation of a plan view showing articles entering and exiting from the present invention.

Referring to FIG. 1, a schematic plan view of the present invention is shown at 10. A line of containers 11 is conveyed to the general apparatus 10 by means of an incoming conveyor 12. Containers 11 are picked up one by one by the starwheel of apparatus 10 and are conveyed through an arcuate extent and deposited upon exiting conveyor 13. The containers 11 which have just been deposited upon conveyor 13 are then grouped together so that they may be advanced to a dispensing or a packing station.

In order to facilitate a more thorough explanation of the present invention, the starwheel sectors shown in FIG. 1 each carry a separate identification number. Accordingly, the sectors are moving in a clockwise direction numbered 1, 2, 3, 4 and 5. Sectors 1 through 5 are mounted on a common central spindle or shaft 31. The sectors move in a clockwise direction as depicted by arrow 15. The sectors move about a planar work surface 65 which is positioned at an elevation that approximates the height of the incoming conveyor 12 and the exiting conveyor 13. Incoming conveyor 12 is of conventional design and is equipped to handle a single line of containers 11. Conveyor 12 is mounted on rollers such as for example 17 and 18. One of the conveyor rollers can be powered or other means (not shown) can be used to cause conveyor 12 to advance a single line of containers 11 toward starwheel 10. The containers 11 are deflected from their forward motion along conveyor 12 by deflector 20. The fingers 21 of the starwheel then cause a container to be positioned within each one of the starwheel pockets 22.

In FIG. 1 starwheel sector 1 and 5 are shown adjacent each other. Consequently, there will be a uniform pickup of containers in each of the starwheel pockets 22. Starwheel sector 1 then advances in a clockwise direction until it is in the position of sector 2. As soon as sector 1 reaches the position of sector 2, it begins to accelerate in its clockwise travel, thus it accelerates quite rapidly then deaccelerates and stops at a position shown by sector 3. The containers 11 carried by the sector are then discharged onto conveyor 13 by the radially outward motion of pusher plate 23. Pusher plate 23 is shown at the maximum point of travel in the sector 3 position. As soon as the containers have been deposited upon conveyor 13, pusher plate 23 is rapidly retracted and the entire sector is immediately accelerated, thus causing it to catch up with the remainder of the empty sectors which are traveling around the starwheel at a constant angular velocity.

Thus, we see that the sectors move with a constant angular velocity as they approach conveyor 12, thus in this area the starwheel operates in conventional fashion. However, as the starwheel sectors 1-5 approach conveyor 13, they no longer operate under the influence of the constant angular velocity and they then act independently of the remainder of the sectors on the starwheel.

After containers 11 have been deposited upon conveyor 13 they are directed in linear fashion along a series of paths 24 separated by guides 25. Conveyor 13 is of course mounted on standard rollers such as 26 and power is supplied by conventional means (not shown).

Figure 2:
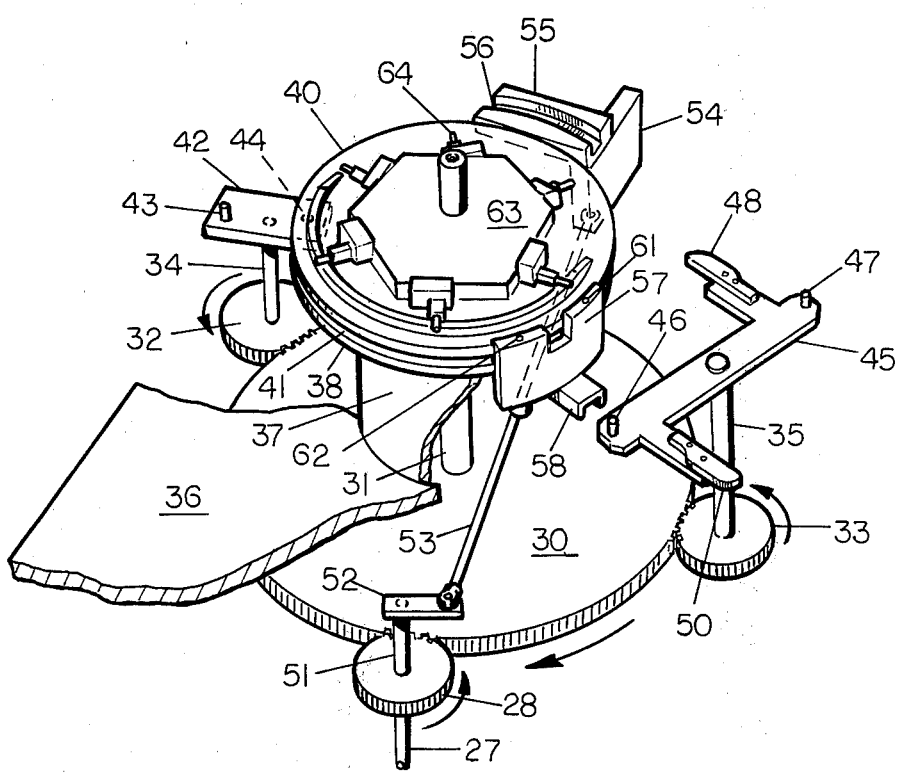
FIG. 2 is a perspective view of the drive mechanism that powers the articulated starwheel of the present invention.

FIG. 2 is a perspective view of the mechanism used to drive the starwheel arrangement which was briefly described in association with FIG. 1. The supports for the various mechanisms have been removed as much as possible to simplify an understanding of how the various components of the apparatus interact with one another. Power is supplied to shaft 27 from a conventional source (not shown). A power gear 28 is affixed near the end of shaft 27. The teeth of power gear 28 mesh with the teeth of drive gear 30. Drive gear 30 which may be considered as a power distributing gear is affixed to a vertically disposed shaft 31. Shaft 31 carries the main rotational driving force that is applied to the previously mentioned sectors, thus causing them to move in their clockwise rotation. Drive gear 30 is also coupled to auxiliary gear 32 and auxiliary gear 33 which are shown in FIG. 2. Gears 32 and 33 are attached to vertically extending shafts 34 and 35 which will be commented upon later. A portion of the lower support plate 36 is shown partly in section in FIG. 2. A portion of support plate 36 is shown with support column 37 attached thereto. Support column 37 is positioned in the center of lower support plate 36. As is also shown in FIG. 1, the centrally positioned shaft 31 which is coupled to drive gear 30, extends in an upward direction through the central portion of support column 37. Support column 37 terminates at its upper end with cam plates 38 and 40. Cam plates 38 and 40 are spaced from one another to provide a cam groove 41 between the upper surface of cam plate 38 and the lower surface of cam plate 40. Cam plates 38 and 40 are held apart from one another by spacers (not shown). It is of course understood that cam plates 38 and 40 are rigidly mounted on the top of support column 37, consequently, cam plates 38 and 40 do not rotate whatsoever.

Attention is once again directed to vertical shafts 34 and 35 which are respectively attached to gears 32 and 33. Shaft 34 is vertically mounted along the axis of auxiliary gear 32. A drive bar 42 is positioned on the upper end of vertical shaft 34. The drive bar 42 rotates with a constant angular velocity, the same as auxiliary drive gear 32. Drive bar 42 contains two vertically disposed cam followers 43 and 44. The cam followers 43 and 44 protrude in an upward direction, however, they do not interfere with the bottom surface of cam plate 38. With each rotation of drive bar 42, cam follower 43 and 44 respectively pass beneath the bottom surface of cam plate 38. The just described mechanism, while not a true geneva drive, will be referred to as a modified geneva drive.

Attention is now directed to auxiliary gear 33 and its axially aligned vertical shaft 35. Shaft 35 also contains a drive bar 45 affixed to the top of the shaft. Two cam followers 46 and 47 are spaced equidistant from the axis of vertical shaft 35 and protrude in an upward direction from their attachment point on the top surface of drive bar 45. This mechanism is also considered to be a modified geneva drive. In addition to cam followers 46 and 47, drive bar 45 contains cams 48 and 50 which are cantilevered from the opposite extremities of drive bar 45. Thus, it can be ascertained that auxiliary gear 33, vertical shaft 35 and drive bar 45 rotate counterclockwise with a uniform angular velocity the same as auxiliary gear 32 and its attached parts.

Not only does power gear 28 provide rotational power to drive gear 30, but it also contains a vertically aligned shaft 51. Shaft 51 contains an eccentrically positioned bar 52 attached to the upper end. The eccentric 52 is in turn coupled with a rod 53.

Rod 53 extends generally horizontally across the apparatus and is pivotally attached to the bottom of slide block 54. The actual mounting of slide block 54 will be shown and commented upon later. Slide block 54 oscillates in a horizontal direction and moves generally radially in and out perpendicular to the axis of shaft 31. A cam block 55 is attached to the upper side of slide block 54. Cam block 55 is attached to and cantilevered from the top of slide block 54. Cam block 55 contains an arcuately disposed cam groove 56 which is used to cause the pusher plate 23 (shown in FIG. 1) to move rapidly in a radially outward direction to eject the containers 11 contained within starwheel pockets 22.

The starwheel sectors which have been commented upon briefly before are each attached to a starwheel sector support 57. The starwheel sector support 57 can be seen in the central portion of FIG. 2. The starwheel sector support 57 contains cam followers located on the radially inward side thereof which track in cam groove 41. A small channel 58 is rigidly attached to the lower part of starwheel sector support 57. The interior of channel 58 provides a cam groove 60 (see FIG. 7) that interacts with cam followers 43, 44 and 46, 47. The just described sector support 57 is rigidly attached to the bottom surface of each sector by means of attachment points 61 and 62.

A drive plate 63 is shown in the top central portion of FIG. 2. Drive plate 63 is attached toward the top end of shaft 31, consequently, it rotates with drive gear 30. Drive plate 63 contains 6 equally spaced moveable cam bars 64 that periodically drive the starwheel sectors 1-5 at a constant angular velocity. This aspect of the present invention will be discussed in greater detail supra.

Figure 3:
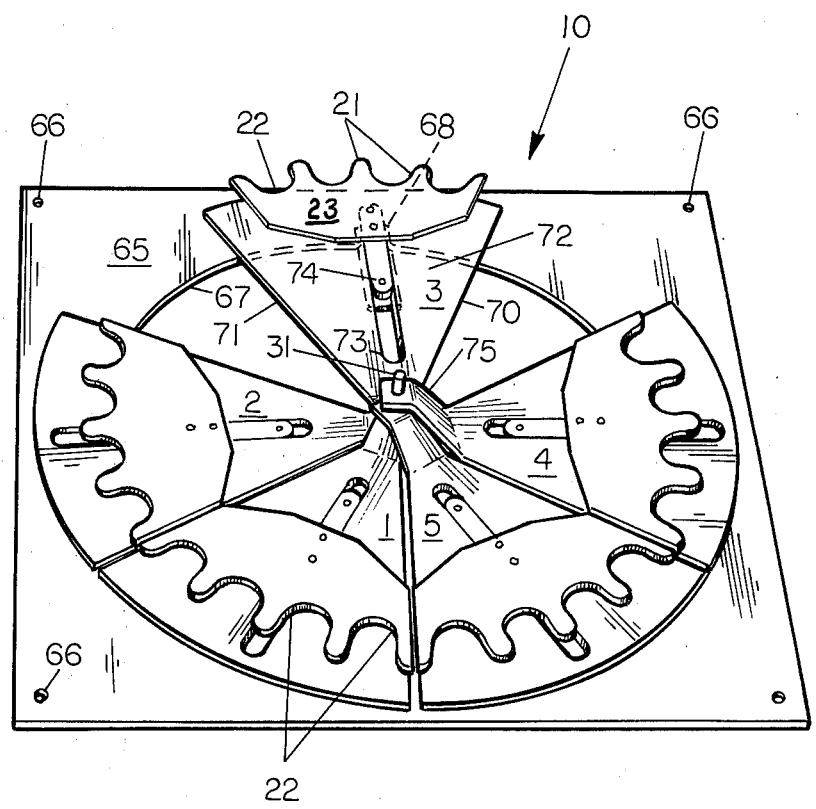
FIG. 3 is a perspective view that shows the individual sectors of the starwheel.

FIG. 3 is a perspective view of the top of the starwheel apparatus 10. The five starwheel sectors 1-5 are shown in more detail than was shown in FIG. 1. The near side of FIG. 3 represents that side from which the containers move in single line fashion into the pockets 22 of the starwheel sectors. The uppermost parts of FIG. 3 represent the exiting position of the apparatus. The pusher plate 23 of sector 3 is shown in its extended position. Sectors 1 and 2 are shown in the position where they move with a constant angular velocity as they transport containers 11 around the periphery of starwheel assembly 10. The sectors 1-5 slide upon an upper support plate 65. Upper support plate 65 is attached to the remainder of the assembly by means of attachment points at the top of posts 66. The upper support plate 65 contains a rather large opening 67 that is of circular configuration for almost its entire circumferential extent. At the exiting position the opening 67 blends into a radially aligned slot 68. The combination of opening 67 and slot 68 provides a cam surface for the cam follower 89 that is positioned on the bottom of each pusher plate 23 of the individual sectors 1-5. Cam follower 89 can be seen in FIG. 6.

Since the sectors 1-5 are almost identical with one another, only one of the sectors 1-5 will be described in detail. Reference is thus made to sector 3 as shown in FIG. 3. Sector 3 has a leading edge 70 and a trailing edge 71. The leading edge 70 of sector 3 coacts with the trailing edge of sector 4 and so on around the starwheel assembly 10. The starwheel sector plate 72 contains an elongate radially aligned opening 73 which extends radially along the central portion of starwheel plate 72. A slide bar 74 fits into opening 73 and is also attached to the underside of pusher blade 23 by suitable fasteners. The hub or vertex 75 of each starwheel sector is attached to the upper end of shaft 31, however, the attachment is not rigid, thus, each starwheel sector 1-5 is permitted to move independently of shaft 31. Shaft 31, while it supplies the rotational force applied to starwheel sectors 1-5, does not supply the rotational power through hub or vertex 75. Hub 75 merely serves as a pivot point for each of the sectors 1-5. As commented upon previously, each one of the sectors 1-5 are identical with each other except in the hub 75 region. As shown in FIG. 3, the hubs of the sectors are in overlapped relation with respect to one another. This arrangement permits a greater degree of freedom of movement in a circumferential direction of one sector with respect to the other.

Figure 4:
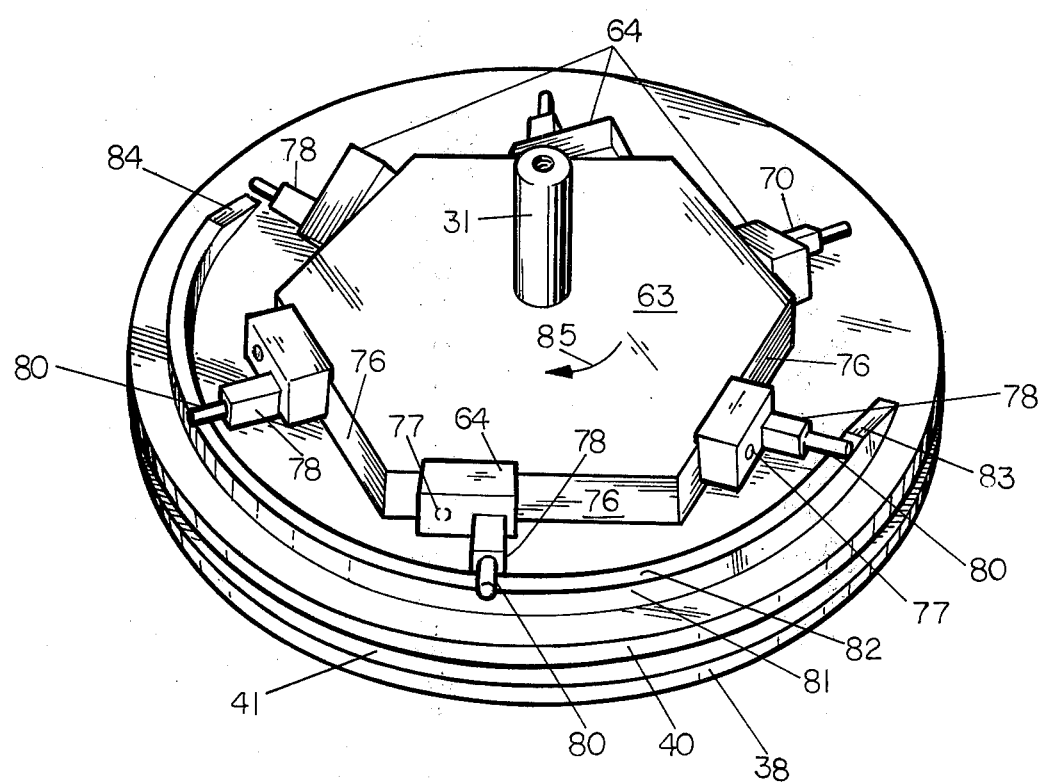
FIG. 4 is a perspective view that shows the cam arrangement for engaging and disengaging rotational power to the starwheel sectors.

FIG. 4 is a more detailed perspective view of the drive plate 63 which is shown in FIG. 2 and which was commented upon briefly previously. Cam plate 38 which is positioned on the bottom is shown in spaced relationship from cam plate 40 which is positioned above cam plate 38. The space between cam plates 38 and 40 provide a cam groove 41. The shaft 31 which is rigidly attached to drive gear 30 as previously shown in FIG. 2, is shown in FIG. 4 as it protrudes in an upward direction through drive plate 63 to which it is rigidly attached. Thus, it can be determined that drive plate 63 rotates with drive gear 30. Cam plates 38 and 40 are fixed in position and do not rotate because cam plates 38 and 40 are attached to support column 37 which in turn is fixed to lower support plate 36 as previously commented upon and shown in FIG. 2. Returning now to FIG. 4, drive plate 63 is conveniently shown in the form of a hexagon. Each one of the hexagonal sides 76 of drive plate 63 contains a pivotally connected cam bar 64. Cam bars 64 are attached to hexagonal sides 76 of drive plate 63 by means of connecting pins 77. Thus, the cam bars 64 are free to pivot about connecting pins 77. Each cam bar 64 has a cantilevered sector engaging lug 78 that is aligned so that its longitudinal axis is perpendicular to and passes through the axis of shaft 31. A cam roller 80 is attached to the very end of sector engaging lug 78. Cam roller 80 coacts with cam surface 82 of cam 81. The cam 81 is circular in configuration and extends slightly more than 180° around the top of cam plate 40. Circular cam 81 is rigidly attached to the top of cam plate 40. Circular cam 81 begins with an inclined planar surface 83 and ends with a similar inclined planar surface at 84. Thus, it becomes evident as drive plate 63 rotates in the direction of arrow 85, cam rollers 80 will respectfully approach the inclined plane 83 of the beginning of cam surface 82. The cam rollers 80 will then one by one proceed up the inclined plane 83, thus raising sector engaging lugs 78 into engagement with the lower part of the sectors 1-5. Sector engaging lug 78 will remain in an elevated position until cam roller 80 descends the exiting inclined plane 84 of cam surface 82. At this time sector engaging lug 78 will drop onto the top surface of cam plate 40 and thus move in a circular path thereon until it once again approaches the inclined plane 83 of cam surface 82.

From the aforegoing description, it can be ascertained that the sectors that are coupled with engaging lugs 78 will move with a constant angular velocity along with shaft 31, which in turn is attached to drive gear 30. When sector engaging lug 78 drops out of engagement, the sectors are no longer powered by shaft 31. The interaction of sector engaging lugs 78 and the sectors which move under their influence will be commented upon more fully later.

Figure 5:
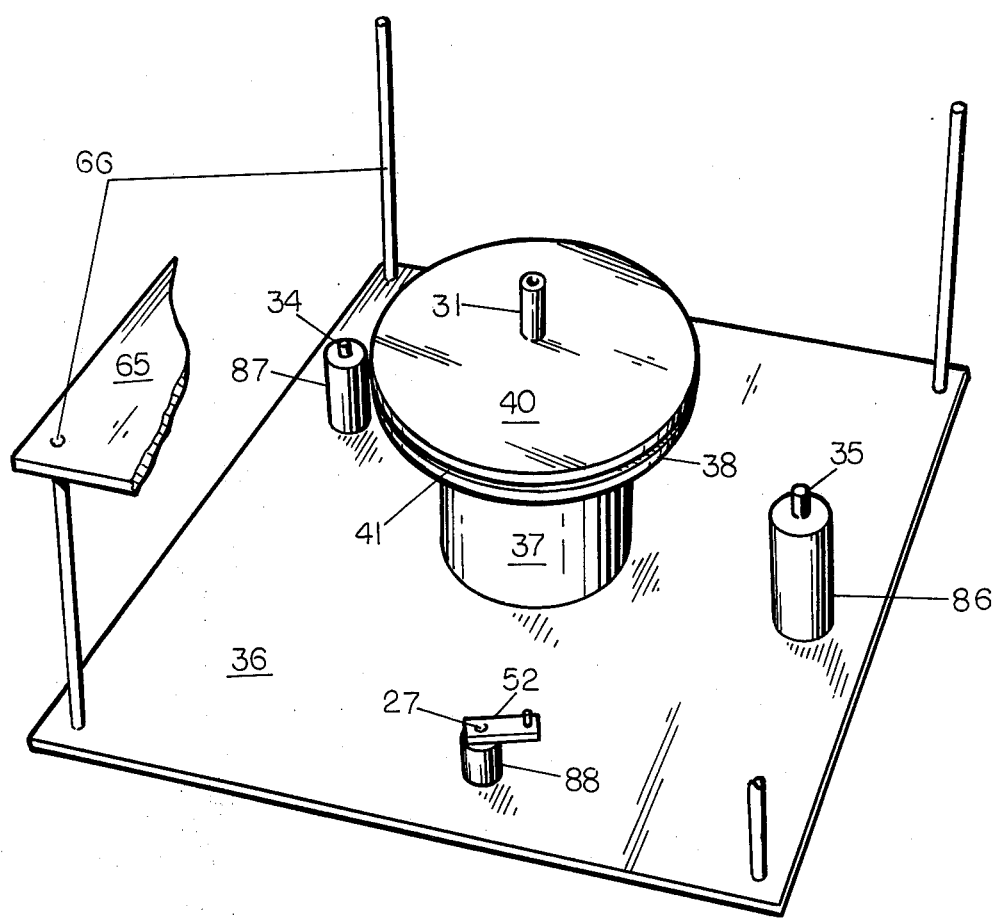
FIG. 5 is a perspective view that shows part of the support structure immediately beneath the starwheel arrangement shown in FIG. 3.

Attention is now directed to the FIG. 5 which shows lower support 36 in its entirety. Lower support plate 36 was shown part in section in FIG. 2 as was support column 37. Support column 37 is anchored to the top surface of lower support plate 36. In turn, cam plate 38 is rigidly attached to the top of support column 37. A spacer plate (not shown) separates cam plate 38 from cam plate 40 which is mounted above cam plate 38.

Vertical shaft 35 is attached to auxiliary gear 33 and extends in an upward direction through lower support plate 36 and also through bearing support 86. Bearing support 86 is rigidly attached to the top of lower support plate 36. In a similar manner, vertical shaft 34 is attached to auxiliary gear 32. Vertical shaft 34 also extends through lower support plate 36 and is journaled in bearing support 87.

In the foreground of FIG. 5, shaft 27 is journaled in bearing support 88. Referring briefly to FIG. 2, it can be seen that shaft 27 supplies not only the rotational torque to the overall apparatus 10, but shaft 27 also extends in an upward direction. An eccentrically positioned bar 52 is fixed to the upper end of shaft 27. The eccentrically positioned bar 52 rotates with a constant angular velocity as does shaft 27.

The lower support plate 36 is attached to upper support plate 65 by means of support columns or posts 66.

Figure 6:
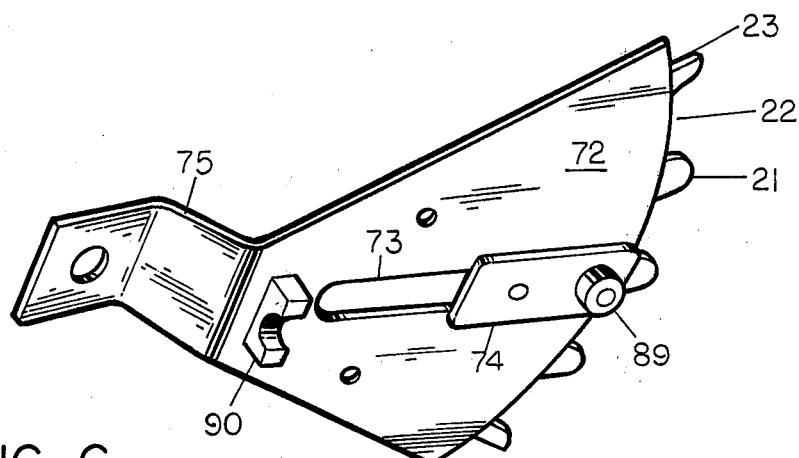
FIG. 6 is a perspective view taken from the bottom of one of the starwheel sectors.

Reference is now made to FIG. 6 wherein a perspective view of the underside of the sectors 1-5 is shown. The pusher plate 23 is shown in an extended position with accompanying fingers 21 and starwheel pockets 22 shown in intercalated relationship. Slide bar 74 is shown beneath starwheel plate 72. Slide bar 74 has a milled section (not shown) that permits it to fit into and slide freely along the lineal extent of opening 73. Slide bar 74 is attached to pusher plate 23. Thus, it can be observed that pusher plate 23 will move when slide bar 74 slides freely along opening 73.

A cam follower 89 protrudes in a downwardly direction from the bottom of slide bar 74. Cam follower 89 follows the edge of opening 67 (shown in FIG. 3) of upper support plate 65. Opening 67 not only provides freedom of movement for sectors 1-5, but also serves as a cam for cam follower 89 to follow. For most of the arcuate extent of travel of the sectors, cam follower 89 is moving in a circular path guided by the opening 67, however, as cam follower 89 reaches the position where containers 11 are discharged from the apparatus 10, cam follower 89 is permitted to become engaged with slot 68 in support plate 65. As soon as pusher plate 23 returns to its retracted position just after discharge of the containers 11 that were transported in starwheel pockets 22, cam follower 89 once again returns to the position that permits it to travel in a circular path against the inside edge of opening 67. A bifurcated coupling block 90 is attached on the underside of starwheel plate 72. The bifurcated coupling block 90 is attached just radially outboard from hub area 75. The bifurcated coupling block 90 coacts with sector engaging lugs 78. The coupling block 90 is shown in FIG. 6 and the engaging lugs are shown in FIG. 4.

As drive plate 63 (once again referring to FIG. 4) rotates in a clockwise direction, it carries cam bars 64 through a traverse of 360°. As the cam bars 64 approach the inclined plane 83 of cam surface 82, cam roller 80 is raised in elevation, thus moving sector engaging lug 78 into engagement with bifurcated coupling block 90. At this particular time the sector is locked into engagement with the rotational force delivered by shaft 31, consequently, the sectors thus engaged move with a uniform angular velocity the same as shaft 31 and drive gear 30. It is during this period of constant angular velocity that containers 11 are grasped by the pocket and finger combination of each sector. Referring again to FIG. 4, as the cam roller 80 reaches the arcuate end of cam surface 82, sector engaging lug 78 moves down planar surface 84 and drops from engagement with bifurcated coupling block 90. At this time the sector is no longer powered by the constant angular velocity supplied by shaft 31. The exact motion taken by the sector from this point until it is once again picked up by the raising of sector engaging lug 78 will be commented upon later.

Figure 7:
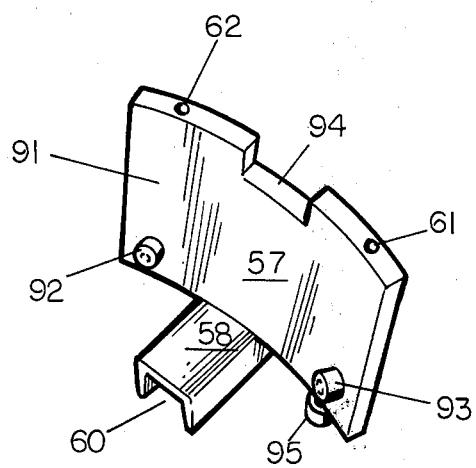
FIG. 7 is a perspective view of the cam follower arrangement attached to the lower side of each starwheel sector.

FIG. 7 is a perspctive view of the starwheel sector support 57 which was shown centrally in FIG. 2. Channel 58 is shown in rigid attachment to the bottom of starwheel sector support 57. The axis of channel 58 forms a cam groove 60 and is in radial alignment with the overall general starwheel assembly 10. The radially inward side 91 of starwheel sector support 57 contains two cam followers 92 and 93. The axis of cam followers 92 and 93 are also in radial alignment and perpendicular to the axis of shaft 31. Referring to FIGS. 2 and 4, the cam groove 41 can be observed. Cam groove 41 is formed by the spaced apart relationship of cam plates 38 and 40. Cam rollers 92 and 93 are disposed in cam groove 41, thus they travel in a continuous circular path around shaft 31. The cam rollers 92 and 93 provide lateral stability to each of the sectors, as well as carrying the major portion of the weight of each sector. The top portion of starwheel sector support 57 contains a cut-out portion 94. The cut-out portion 94 permits free movement of slide bar 74. An additional cam follower 95 is shown attached to the bottom part of starwheel sector support 57. Cam follower 95 follows the cam surfaces 48 or 50 shown in FIG. 2. Cam surfaces 48 and 50 are cantilevered from the drive bar 45 also shown in FIG. 2. At the proper time of the sequence in the motion of the sectors, cam roller 95 engages the curved surface of cam 48.

Figure 8:
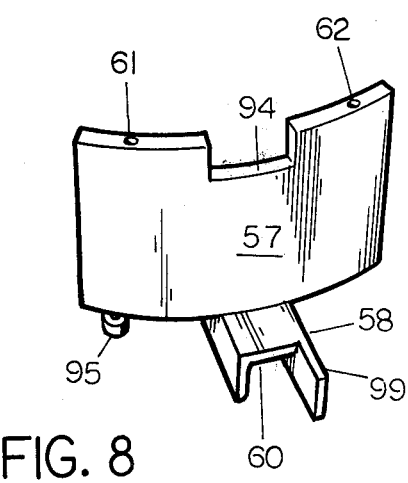
FIG. 8 is another view of the cam follower arrangement shown in FIG. 7.

FIG. 8 is a perspective view of starwheel sector support 57, however, FIG. 8 shows the radially outward side of support 57.

Figure 9:
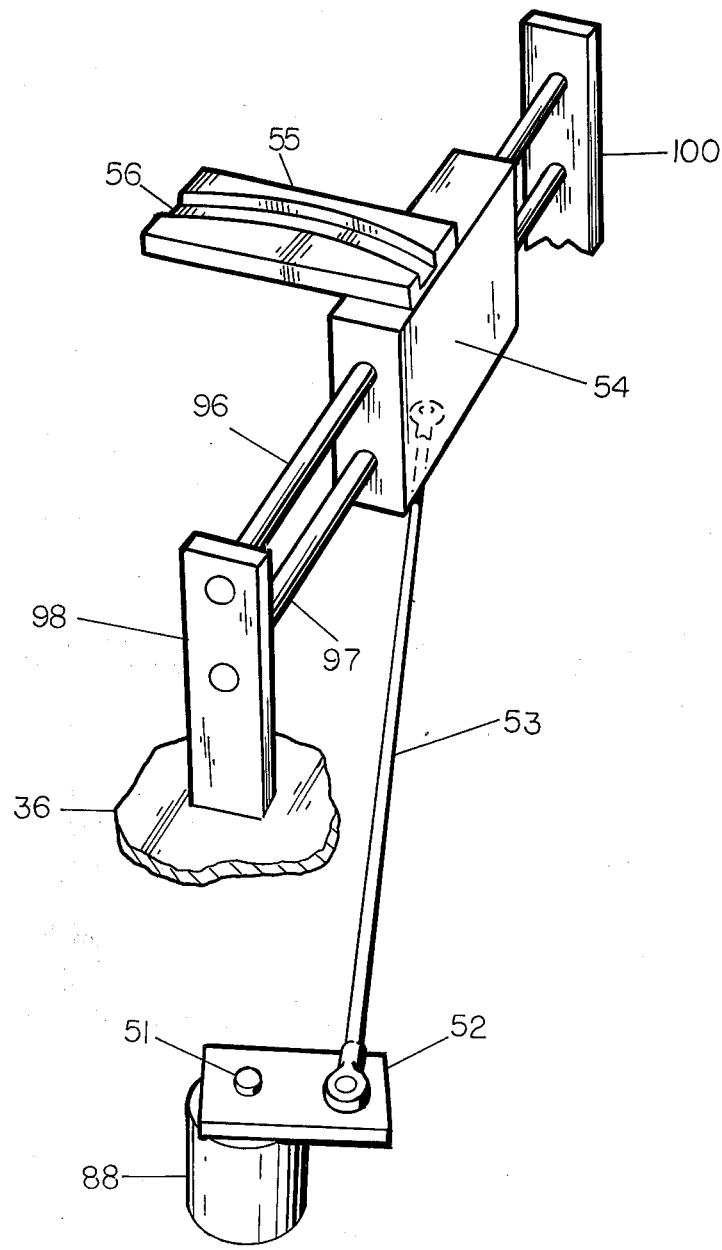
FIG. 9 is a perspective view of the reciprocating cam arrangement for unloading articles from each starwheel.

The radially outward end of channel 58 contains a guiding lug 99 on one side thereof. Lug 99 helps in the engagement of cam followers 43 and 44 as they make their initial contact with channel 58 and its cam groove. Referring to FIG. 9, the slide block 54 arrangement is shown in perspective. Slide block 54, as previously described in association with FIG. 2, is connected by means of rod 53 to eccentric bar 52. Eccentric bar 52 is of course rigidly coupled to shaft 51 which in turn is journaled through bearing support 88. As shaft 51 rotates, the eccentric arm 52 will traverse a path of 360°, thus causing rod 53 to move back and forth; since rod 53 is pivotally connected to the bottom of slide block 54, the block will consequently move back and forth along support rods 96 and 97. Support rods 96 and 97 are held in fixed relationship with respect to support posts 98 and 100. Support post 100 can be conveniently anchored to any portion of the apparatus framework, however, its exact tiedown is not shown in the drawings. Support post 98 is mounted to the top of lower support plate 36.

Slide block 54 has mounted thereon a cam bar 55. The cam bar 55 contains an arcuate cam groove 56 therein.

Cam groove 56 coacts with cam follower 89 which can be seen on the bottom of slide bar 74 in FIG. 6. When the sectors arrive at the discharge station, cam follower 89 engages with arcuate cam groove 56 and begins a radially outward movement which is augmented by the radially outward motion provided by slide block 54. This combination of cams provides a smooth motion to pusher plate 23, thus containers 11 are not damaged.

A description of the detailed components of the present invention have been commented upon in previous paragraphs. The complete operation of the invention will now be described so that a better understanding may be had of how the various parts interact with one another. First, referring to FIG. 1, it becomes apparent that the containers approach the overall apparatus 10 in singular file. The containers are guided from a conveyor belt 12 into each individual starwheel pocket 22 of the sectors 1–5. As sector 1 rotates in a clockwise direction, it is driven in constant angular velocity because it is coupled directly to drive gear 30 by means of sector engaging lugs 78 which are raised to their uppermost position since cam roller 80 is moving along the raised portion of cam surface 82. Sector engaging lug 78, as previously pointed out, engages with the bifurcated coupling block 90 which is attached to the underside of each one of sectors 1–5. As cam roller 80 moves down the incline plane 84 (FIG. 4) of cam surface 82, the sector engaging lug 78 moves out of engagement with bifurcated coupling block 90, consequently, the sector is moved in an arcuate path only under the influence of the remainder of the sectors that are passing through the loading zone and are under direct power from drive gear 30. In other words, the disengaged sector is pushed slightly by the sectors still under power. As sector engaging lug 78 disengages itself from bifurcated coupling block 90, one of the cam followers 43 or 44 as shown in FIG. 2 moves into engagement with lug 99 (FIG. 8) of channel 58. Thus, cam follower 43 or 44 enters into the recess 60 of channel 58 and immediately causes the sector to undergo an acceleration that is greater than the remainder of the moving sectors. The sector that is under the influence of one of the cam followers 43 or 44 first accelerates and moves ahead of the remainder of the sectors, whereupon the sector is immediately deaccelerated until it stops at the discharge station. Just as the sector enters into the discharge station, cam follower 89 begins to traverse the arcuate cam groove 56 which is mounted upon slide block 54. At this particular moment not only is cam follower 89 engaged with the arcuate cam groove of 56 but it is also following the inside edge of opening 67 in upper support plate 65. The cam follower 89 locks into slot 68 just as the sector is completely deaccelerated. At this time and shortly before, pusher plate 23 and its complement of containers begins to move in a radially outward path. As soon as slide block 54 has reached its radial most extent, it begins to retract. As it retracts and moves in a radially inward direction, the next sector that is advancing in a clockwise direction under the influence of the modified geneva drive comprised of shaft 34, bar 42 and cams 43, 44 catches up with the sector that has been completely immobilized. The sector is then nudged in a clockwise direction whereupon cam follower 95 (see FIGS. 7 and 8) is engaged with one of the cam surfaces provided by cams 48 and 50 which are mounted on drive bar 45. The coaction between cam roller 95 and one of the cam surfaces 48, 50 places the sector and its attached starwheel sector support 57 into position whereby either one of cam followers 46 or 47 of the second modified geneva drive will become engaged with cam groove 60 of channel 58. At this time the sector is once again accelerated so that it in essence catches up with the remainder of the sectors which are moving with constant angular velocity and are approaching the loading station adjacent conveyor 12. Just as the cam follower 46 or 47 disengages with cam groove 60 of channel 58, sector engaging lug 78 begins to rise under the influence of cam surface 82 and once again engages with bifurcated coupling block 90 which is attached to the underside of the sector and it is then once again under the influence of the rotational force supplied by gear 30. Thus, the sector advances once again to the loading station adjacent conveyor 12 where it picks up a new supply of containers that are to be transported to the discharge station adjacent conveyor 13. Referring to FIG. 2, the drive bar 45 and its associated cam follower 46 can be seen as cam 46 exits from cam groove 60 in channel 58 and as sector engaging lug 78 begins its upward movement along the incline plane 83 of cam surface 82.

In association with the detailed description of the apparatus that has heretofore been set forth, the method of transporting articles is also considered to be novel. It has been quite common in the prior art to utilize auxiliary devices and guides to remove articles from starwheels. In the present invention the actual pockets of the starwheel move from their normal circular path and discharge not one, but a plurality of articles from the starwheel. The articles transported by the starwheel arrangement of the present invention can be containers such as bottles, cups, tubs and the like.

Referring to FIG. 1, the containers are moved serially aligned along conveyor belt 12 to a loading station adjacent to the starwheel assembly 10. The containers are loaded into pockets 22 on each starwheel sector. The starwheel sector and the containers carried thereon moves with a constant angular velocity. The containers depart from their constant angular velocity and are accelerated through part of their arcuate travel; the containers then are deaccelerated through yet another part of their travel whereupon the containers stop their arcuate movement around the starwheel. The containers then in groups move radially away from the starwheel where they are deposited on an exiting conveyor. As can be observed in FIG. 1, the exiting containers are arranged in columns or rows without the help of guides or other diverting apparatus.

What is claimed is:

1. An apparatus for conveying a plurality of containers through an arcuate path including an articulated starwheel, said starwheel comprised of a plurality of sectors each pivoted for independent movement around a central point, drive means for supplying rotational power to a shaft, the axis of which coincides with said central point, means for coupling and uncoupling said rotational power to said sectors so that said sectors move at least through a portion of their arcuate travel at a constant angular velocity, auxiliary drive means coupled to said drive means for engaging said sectors and accelerating and deaccelerating said sectors in an arcuate direction and means coupled to said drive means for simultaneously ejecting all of the containers transported by each sector.

2. An apparatus for conveying a plurality of containers around a circular path including an articulated starwheel comprised of a plurality of sectors, a first drive means for moving said sectors through a major portion of their circular travel at a constant angular velocity, a second drive means coupled to said first drive means for accelerating and deaccelerating container loaded sectors prior to the delivery of said containers, a third drive means coupled with said first drive means for simultaneously discharging a plurality of containers from one of said sectors, a fourth drive means coupled with said first drive means to accelerate and deaccelerate said sector subsequent to the discharging of said containers from said apparatus.

3. An apparatus for conveying a plurality of containers around a circular path including an articulated starwheel comprised of a plurality of sectors pinned at their vertex for angular movement about a central axis, said axis oriented generally perpendicular to said sectors, a drive shaft coincident with said central axis for delivering a constant angular velocity to at least some of said sectors, the coupling between said drive shaft and said sectors occurring at a location remote from said vertex, a power distributing gear attached to the lower extent of said drive shaft, power input means coupled with said power distributing gear for rotating it at a constant angular velocity, a first drive gear coupled with said power distributing gear for rotating a first modified geneva drive that is periodically coupled to each of said sectors for rotating them to a position for discharge of the containers transported thereon, a second drive gear coupled with said power distributing gear for rotating a second modified geneva drive that is periodically coupled to each of said sectors for rotating them away from the container discharge position, and means engageable with said sectors for simultaneous movement of a plurality of containers from said sectors.

4. An apparatus for conveying a plurality of containers around a circular path including an articulated starwheel comprised of a plurality of sectors each occupying an equal angular portion of the starwheel circumference, each of said sectors pinned at their vertex for free angular movement about a vertically disposed central axis, said sectors mounted for movement in a path perpendicular to said central axis, a drive shaft coincident with said central axis for delivering a constant angular velocity to said sectors, cam means interdisposed between said drive shaft and said sectors for engaging and disengaging rotational power to drive at least some said sectors at a constant angular velocity, said engaging and disengaging of rotational power occurring at a location remote from said vertex, a rotational power input gear coupled to a power distributing gear for rotating it at a constant angular velocity, a first drive gear coupled with said power distributing gear for rotating a first modified geneva drive that is periodically coupled to each of said sectors for rotating them to a position for discharge of the containers transported thereon, a second drive gear coupled with said power distributing gear for rotating a second modified geneva drive that is periodically coupled to each of said sectors for rotating them away from the container discharge position, and oscillatory means driven by said power input means to move a portion of each sector when it is at a discharge station to effect delivery of all of the containers transported by said sector.

5. An apparatus for conveying a plurality of containers around a circular path including an articulated starwheel comprised of a plurality of sectors each occupying an equal angular portion of the starwheel circumference, the sum of the angles of the sectors being less than the sum of the entire circumference of the starwheel, each of said sectors pinned at their vertex for free angular movement about a vertically oriented central axis, said sectors mounted for movement in a planar path perpendicular to said central axis, a drive shaft coincident with said central axis for delivering a constant angular velocity to said sectors, a plate attached to said drive shaft and underlying said sectors, a plurality of moveable lugs circumferentially positioned around the periphery of said plate, an arcuately disposed cam surface supported adjacent to and beneath said lugs so that said lugs are biased into engagement and disengagement with said sectors, thus coupling rotational power to drive at least some of said sectors through at a constant angular velocity, said engaging and disengaging of rotational power occurring at a location remote from said vertex, a rotational power input gear coupled to a power distributing gear which is attached to said drive shaft for driving said drive shaft at a constant angular velocity, a first drive gear coupled to said power distributing gear for rotating a shaft driven first modified geneva drive that is periodically coupled to each of said sectors for rotating them toward a position for discharge of the containers transported thereon, a second drive gear coupled with said power distributing gear for rotating a shaft driven second modified geneva drive that is periodically coupled to each of said sectors for rotating them away from a container discharge position, and an eccentric shaft driven by said rotational power input gear, said eccentric shaft coupled to a drive rod which in turn is coupled to cam means for moving a portion of each sector when it is at a discharge station to effect delivery of all the containers transported by said sector.

6. An apparatus as set forth in claim 5 wherein said cam means is comprised of a cam follower (89) that coacts simultaneously with a first cam surface (68) in radial alignment and a second cam surface (56) in arcuate alignment.

7. An apparatus as set forth in claim 5 wherein the starwheel is comprised of an even number of equal angular sector positions and the actual number of sectors is one less than the number of sector positions.

8. An apparatus as set forth in claim 5 wherein each sector is supported by a plurality of cam rollers (92) (93) that coact within the confinement of parallel oriented plates.

9. The method of transporting a plurality of articles from one location to another comprising;
 (a) moving a serially aligned singular column of articles to an articulated starwheel comprised of individual starwheel sectors,
 (b) loading said articles in intercalated fashion into pockets on each starwheel sector while said sectors are moving at a constant angular velocity,
 (c) accelerating each individual starwheel sector toward an article discharge station,
 (d) deaccelerating each individual starwheel sector as it approaches the discharge station,
 (e) stopping the starwheel sector at the discharge station,
 (f) discharging from the sector the articles that have been transported by said sector.

10. The method of transporting a plurality of articles in an arcuate path from one location to another comprising the steps of;

(a) moving a continuous in seriatim line of articles to an articulated starwheel comprised of individual starwheel sectors,
(b) loading said articles into pockets on each starwheel sector while said sectors are moving about a central pivot point at a constant angular velocity,
(c) accelerating each individual starwheel sector through an arcuate path toward an article discharge station,
(d) deaccelerating each individual starwheel sector as it approaches said discharge station,
(e) stopping the deaccelerated starwheel sector at said discharge station,
(f) discharging in a radial direction, the articles that have been transported by said sector.

11. The method of transporting a plurality of containers from one position where said containers are aligned in seriatim fashion to another position where said containers are aligned in at least one column including the steps of;
(a) moving a serially aligned singular column of containers from a moving belt to an articulated starwheel comprised of individual starwheel sectors each having an equal number of container receiving pockets,
(b) moving said sectors with empty pockets thereon toward a container receiving station,
(c) loading said containers into said pockets on each starwheel sector while said sectors are moving through said loading station at a constant angular velocity,
(d) accelerating each individual starwheel sector one at a time through an arcuate path toward a container discharge station,
(e) deaccelerating each individual starwheel sector one at a time as it approaches said discharge station,
(f) stopping the arcuate movement of said sector while at the discharge station,
(g) discharging in a radial direction the containers that have been transported by said sector.

12. The method of transporting a plurality of containers from one position where said containers are aligned in seriatim fashion to another position where said containers are aligned in at least one column including the steps of;
(a) moving a serially aligned singular column of containers along a conveyor at a constant velocity,
(b) moving a plurality of starwheel sectors with empty pockets thereon toward a container receiving station,
(c) loading said containers one at a time into said pockets on each starwheel sector while said sectors are moving through said loading station at a constant angular velocity,
(d) discontinuing the constant angular velocity of said starwheel sector,
(e) acelerating each individual starwheel sector one at a time subsequent to the discontinuance of said angular velocity through an arcuate path toward a container discharge station,
(f) deaccelerating each individual starwheel sector one at a time as it approaches said discharge station,
(g) stopping the arcuate movement of said sector while at the discharge station,
(h) simultaneously discharging in a radial direction, the containers that have been transported by said sector.

13. The method of transporting a plurality of containers from one conveyor belt where said containers are aligned in seriatim fashion to another conveyor belt where said containers are aligned in a plurality of columns including the steps of;
(a) moving a serially aligned singular column of containers along a conveyor belt that is moving with a constant velocity,
(b) moving a plurality of starwheel sectors with empty pockets thereon toward a container receiving station,
(c) loading said containers one at a time into said pockets on each starwheel sector while said sectors are moving in an arcuate path through said loading station at a constant angular velocity,
(d) discontinuing the constant angular velocity of said starwheel sector,
(e) accelerating each individual starwheel sector one at a time subsequent to the discontinuance of said angular velocity through an arcuate path toward a container discharge station,
(f) deaccelerating each individual starwheel sector one at a time as it approaches a discharge station,
(g) stopping the arcuate movement of said sector and the containers it transports at a discharge station,
(h) accelerating a portion of the starwheel sector in a radial direction so that the containers positioned thereon are moved toward a discharge conveyor belt,
(i) deaccelerating the containers as they approach said discharge belt,
(j) simultaneously depositing onto said discharge belt the containers that have been transported by said sector.

14. The method of transporting a plurality of containers from a conveyor belt where said containers are aligned in seriatim fashion to another conveyor belt where said containers are aligned in a plurality of columns including the steps of;
(a) moving a serially aligned singular column of containers along a conveyor belt that is moving with a constant velocity,
(b) moving a plurality of starwheel sectors each having an equal angular extent with an equal number of container receiving pockets thereon toward a container receiving station,
(c) loading said containers one at a time into individual container receiving pockets on each starwheel sector while said sectors are moving in circular path through said loading station at a constant angular velocity,
(d) discontinuing the constant angular velocity of said starwheel sector,
(e) accelerating each individual starwheel one at a time subsequent to the discontinuance of said angular velocity through a circular path toward a container discharge station,
(f) stopping the circular movement of said sector and the containers it transports at a discharge station,
(g) accelerating a portion of the starwheel sector in a radial direction so that the containers carried thereon are moved toward a discharge conveyor belt,
(h) deaccelerating the containers as they approach said discharge belt,
(i) simultaneously sliding said containers onto said discharge belt,
(j) recycling said sectors in a circular path so that they once again are coupled to a constant angular velocity drive that moves them toward the loading station.

* * * * *